Patented Oct. 11, 1938

2,132,845

UNITED STATES PATENT OFFICE 2,132,845

PROCESS FOR PURIFICATION OF TRINITROTOLUENE

James B. Castner, Woodbury, N. J., and Max C. Knake, Washburn, Wis., assignors to E. I. du Pont de Nemours & Company, Wilmington, Del., a corporation of Delaware No Drawing. Application September 12, 1936, Serial No. 100,470

6 Claims. (Cl. 260—645)

The present invention relates to a process for the purification of trinitrotoluene, and particularly to an improved process for the purification thereof by means of an alkaline sulphite.

As is well known, trinitrotoluene may be prepared by the nitration of toluene with a suitable nitration acid. Although trinitrotoluene of suitable purity may be prepared directly in this manner, the process is rendered extremely inefficient, due to the fact that the acids necessary to obtain such degree of purity must be so strong that a considerable portion of the trinitrotoluene formed is dissolved before the completion of the nitration. For this reason, it is common in the art to manufacture a crude trinitrotoluene by the use of weaker acids that do not dissolve and thereby waste so much of the material during the process of its manufacture. This crude trinitrotoluene is then purified by treatment with suitable reagents.

The crude material is composed chiefly of the symmetric or alpha form of trinitrotoluene which constitutes the desirable product. The impurities present are comprised largely of the undesirable beta and gamma isomers. The removal of these bodies constitutes the prime function of the purification treatment necessary to produce trinitrotoluene suitable for use in explosives of high quality. The methods heretofore used for this purpose, however, employing reagents such as alcohol, acetone, carbon tetrachloride, toluol, and alkaline sulphites, are unsatisfactory because they also dissolve a substantial quantity of the alpha trinitrotoluene. Methods using sulphites are illustrated in U. S. Patent No. 1,297,524, issued to Wollenberg et al., and in U. S. Patent No. 1,975,598, issued to Davies.

The object of the present invention is a process for producing purified trinitrotoluene in greater yields. An additional object is an improved method for purifying trinitrotoluene by treatment with an alkaline sulphite. Further objects will be apparent from the detailed description of the invention which follows.

The present invention involves repeatedly regraining trinitrotoluene and treating solid particles thereof with an aqueous solution of an alkaline sulphite having a controlled pH value, and takes full advantage of the fact that when trinitrotoluene is crystallized, part of the impurities therein form an external coating around the kernel of alpha trinitrotoluene.

We have discovered that a greater yield of trinitrotoluene of higher melting point and consequent higher degree of purity than that prepared by any prior process employing efficient nitration methods, can be produced by treating solid crystals of crude trinitrotoluene repeatedly after each regraining, with an aqueous solution of an alkaline sulphite, which solution has a controlled pH value.

We prefer to employ the following process. The crude molten trinitrotoluene is crystallized by cooling. The crystals are treated with sodium sulphite solution in which the pH value is controlled between 7.0 and 8.3, either by the addition of sulphur dioxide or sodium bisulphite; or a buffer means such as boric acid, or other suitable means which maintains the pH of the solution at the desired value throughout the period of treatment. The crystals so treated are washed with cold water, and then remelted in the presence of steam. The molten trinitrotoluene is separated from the water layer and grained. The grain is subjected to a second treatment with the sulphite solution as described in the foregoing. It is then washed, melted, and regrained. The final grain thus produced displays a purity not hitherto achieved commercially without the use of strong acids and concurrent loss in efficiency. Due to the controlled pH value of the sulphite solution, a larger yield is obtained than is the case when no such adjustment is made.

The following examples demonstrate the extent of the increases in both the purity and the yield, attained by the application of the principles of our invention.

Example I

Three thousand pounds of crude molten trinitrotoluene, having a melting point of 78° C., were treated according to the foregoing process. The final grain displayed a melting point of 80.59° C. Concurrent runs were made with similar crude material, but only a single treatment with the sulphite solution was employed. The resulting material exhibited melting points of 80.35° C. or under.

Example II

One hundred pounds of crude trinitrotoluene, in the form of fine particles, were treated in the solid state, namely, at temperatures below 76° C. with a sodium sulphite solution wherein the pH value was controlled between 7.0 and 8.3 by the addition of boric acid as a buffer. A yield of 93.7 pounds of purified trinitrotoluene was obtained. A like amount of similar material, treated with sodium sulphite solution without the addition of a pH control means thereto, gave a yield of 89.7 pounds of purified trinitrotoluene. This indicates that a 4% increase in yield is accomplished by controlling the pH of the sulphite solution during the washing treatment.

As stated in the foregoing, the process described constitutes the preferred embodiment of the principles of our invention. It is to be understood that numerous variations in detail may be effected therein without transcending the scope of the inventive concept. Thus, any suitable means may be employed for attaining and controlling the desired pH value of the sulphite solution. Although we find that two treatments with the sulphite and graining processes will produce material sufficiently pure for our purposes, additional treatments may be employed if a greater degree of purity is desired. However, the second treatment usually removes as much of the impurities as can be removed efficiently. Other variations in detail will be apparent to any one skilled in the art. We, therefore, intend to be limited only by the following patent claims.

We claim:

1. The process for the purification of trinitrotoluene which comprises treating solid particles thereof with an aqueous solution containing both an alkali metal sulphite and a means for controlling the pH of said solution at a value of 7.0 to 8.3, said means comprising an acid reacting material selected from the group consisting of sulphur dioxide, sodium bisulphite, and boric acid.

2. The process according to claim 1, wherein the means for controlling the pH value is boric acid.

3. The process for the purification of trinitrotoluene which comprises treating solid particles thereof with an aqueous solution of an alkali metal suphite, said solution having a pH value maintained between 7.0 and 8.3.

4. The process for the purification of trinitrotoluene which comprises treating solid particles thereof with an aqueous solution of an alkali metal sulphite, said solution having a pH value maintained between 7.0 and 8.3, remelting said particles and regraining; subjecting the regrained material to a second treatment with a similar solution, remelting and regraining.

5. The process for the purification of trinitrotoluene which comprises treating solid particles thereof with an aqueous solution of an alkali metal sulphite, remelting said particles and regraining; subjecting said regrained material to a treatment with a similar solution, remelting and regraining.

6. The process for the purification of trinitrotoluene which comprises treating said material at a temperature below 76° C. with an aqueous solution of an alkali metal sulphite, the alkalinity of said solution having been reduced by a means for controlling the pH value thereof throughout the period of said treatment, said means comprising an acid reacting material selected from the group consisting of sulphur dioxide, sodium bisulphite, and boric acid.

JAMES B. CASTNER.
MAX C. KNAKE.